US008362881B2

(12) United States Patent
Gallo et al.

(10) Patent No.: US 8,362,881 B2
(45) Date of Patent: Jan. 29, 2013

(54) METHOD FOR STORING DATA AS WELL AS A TRANSPONDER, A READ/WRITE-DEVICE, A COMPUTER READABLE MEDIUM INCLUDING A PROGRAM ELEMENT AND SUCH A PROGRAM ELEMENT ADAPTED TO PERFORM THIS METHOD

(75) Inventors: Francesco Gallo, Hamburg (DE); Hauke Meyn, Krempermoor (DE)

(73) Assignee: NXP B.V., Eindhoven (NL)

( * ) Notice: Subject to any disclaimer, the term of this patent is extended or adjusted under 35 U.S.C. 154(b) by 523 days.

(21) Appl. No.: 12/519,749

(22) PCT Filed: Dec. 11, 2007

(86) PCT No.: PCT/IB2007/055027

§ 371 (c)(1),
(2), (4) Date: Jun. 17, 2009

(87) PCT Pub. No.: WO2008/081370

PCT Pub. Date: Jul. 10, 2008

(65) Prior Publication Data

US 2010/0013606 A1 Jan. 21, 2010

(30) Foreign Application Priority Data

Dec. 27, 2006 (EP) .................................... 06026940

(51) Int. Cl.

| | |
|---|---|
| ***H04Q 5/22*** | (2006.01) |
| ***G08B 13/14*** | (2006.01) |
| ***G08B 5/36*** | (2006.01) |
| ***G05B 19/00*** | (2006.01) |
| ***G06K 19/06*** | (2006.01) |

(52) U.S. Cl. ................... 340/10.51; 340/10.1; 340/10.3; 340/572.1; 340/5.65; 340/815.54; 340/10.52; 235/492

(58) Field of Classification Search ................. 340/10.1, 340/10.3, 572.1–572.9, 505, 10.52, 5.65, 340/825.54, 825.4, 10.33; 455/41.2, 41, 455/73, 76, 77, 78, 82, 83, 38.3, 343; 711/117, 711/118, 141, 146, 137, 213, 217, 170, 155, 711/156, 100, 171; 709/209, 224
See application file for complete search history.

(56) References Cited

U.S. PATENT DOCUMENTS

2004/0015969 A1* 1/2004 Chang ........................... 718/100
2005/0077356 A1* 4/2005 Takayama et al. ............ 235/451
(Continued)

FOREIGN PATENT DOCUMENTS

GB 2 333 630 A 7/1999
WO 03/042799 A2 5/2003

OTHER PUBLICATIONS

NFC Forum; "Type 2 Tag Operation—Technical Specification"; Jul. 9, 2007; Retreived From Internet May 9, 2008; http://www.nfc-forunn.org.specs/ spec_license_download_spec_85a9d762b002007ic719cb9b2c5a5b94b3141dda/NFCForum-TS-Type-2-Tag_1.0.pdf; p. 1-44.

*Primary Examiner* — Brian Zimmerman
*Assistant Examiner* — Mirza Alam

(57) ABSTRACT

A method for storing or reading data in a memory array of a transponder and a corresponding transponder, read/write device and program element is described. Therein, a data structure for storing data within the memory array is defined by a predetermined protocol. The data structure comprises: a header data block including predefined header data; an application data block for storing application data; a memory control data block including a reservation indicator for indicating a reserved partial memory area of the memory array where, in accordance with the predetermined protocol, application data cannot be read or written by a protocol compliant reader device. The method for storing data comprises storing additional application data in the reserved partial memory area. Thereby, memory areas which, according to the predetermined protocol, are not used can be used for new applications, data can be hidden in these areas such that they can not be read by protocol compliant reader devices and the data structure read or written by the method of the invention is compatible with the former predetermined protocol.

20 Claims, 3 Drawing Sheets

U.S. PATENT DOCUMENTS

| | | | | |
|---|---|---|---|---|
| 2005/0127180 | A1 * | 6/2005 | Matsumoto et al. | 235/451 |
| 2006/0016870 | A1 | 1/2006 | Bonalle et al. | |
| 2006/0129806 | A1 * | 6/2006 | Walmsley | 713/161 |
| 2006/0163365 | A1 * | 7/2006 | Nakabe | 235/492 |
| 2006/0229113 | A1 * | 10/2006 | Rowse | 455/574 |
| 2007/0001853 | A1 * | 1/2007 | Otranen | 340/572.1 |
| 2007/0125836 | A1 * | 6/2007 | McAllister et al. | 235/375 |
| 2008/0065877 | A1 * | 3/2008 | Son et al. | 713/151 |

* cited by examiner

| Byte Number | 0 | 1 | 2 | 3 | Block |
|---|---|---|---|---|---|
| UID / Internal | UID0 | UID1 | UID2 | Internal0 | 0 |
| Serial Number | UID3 | UID4 | UID5 | UID6 | 1 |
| Internal / Lock | Internal1 | Internal2 | Lock0 | Lock1 | 2 |
| CC | CC0 | CC1 | CC2 | CC3 | 3 |
| Data | Data0 | Data1 | Data2 | Data3 | 4 |
| Data | Data4 | Data5 | Data6 | Data7 | 5 |
| Data | Data8 | Data9 | Data10 | Data11 | 6 |
| Data | .. | .. | .. | .. | . |
| Data | .. | .. | .. | .. | . |
| Data | .. | .. | .. | .. | . |
| Data | .. | .. | .. | .. | . |
| Data | .. | .. | .. | .. | n |
| Lock / Reserved | .. | .. | .. | .. | . |
| Lock / Reserved | .. | | .. | .. | . |
| Lock / Reserved | .. | .. | .. | .. | k |

Fig 1

METHOD FOR STORING DATA AS WELL AS A TRANSPONDER, A READ/WRITE-DEVICE, A COMPUTER READABLE MEDIUM INCLUDING A PROGRAM ELEMENT AND SUCH A PROGRAM ELEMENT ADAPTED TO PERFORM THIS METHOD

FIELD OF INVENTION

The present invention relates to the field of storing and reading data in a transponder wherein data can be stored in accordance with a storage protocol. Particularly, the present invention relates to storing and reading additional data in a transponder such as an all contactless memory card or a RFID (Radio Frequency IDentification) tag in which data can be stored in accordance with the Type 2 Tag Operation standardization of the NFC Forum.

ART BACKGROUND

Identification products such as smart cards and RFID tags are used widely in fields such as transport (ticketing, road tolling, baggage tagging), finance (debit and credit cards, electronic purse, merchant card), communications (SIM card for GSM phone), and tracking (access control, inventory management, asset tracking). Radio Frequency IDentification (RFID) is an automatic identification method, relying on storing and remotely retrieving data using devices called RFID tags or transponders. An RFID tag is an object that e.g. can be attached to or incorporated into a product, animal, or person e.g. for the purpose of identification using radio waves. Chip-based RFID tags contain e.g. silicon chips and antennas. Passive tags require no internal power source, whereas active tags require a power source.

International standard ISO14443A is an industry standard for contactless smart cards. ISO14443A-compliant products provide RF communication technology for transmitting data between a card or tag and a reader device. For example, in electronic ticketing for public transport, travelers just wave their card over a reader at the turnstiles or entry point, benefiting from improved convenience and speed in the ticketing process. Such products are set to be the key to individual mobility in the future, supporting multiple applications including road tolling, airline tickets, access control and many more.

Evolving from a combination of contactless identification and networking technologies, Near Field Communication (NFC) (see for example the standard ISO 18092) is a very short-range wireless technology, for distances measured in centimeters, and is optimised for intuitive, easy and secure communications between various devices without user configuration. In order to make two devices communicate, users bring them close together or even make them touch. The devices' NFC interfaces will automatically connect and configure themselves to form a peer-to-peer network. NFC can also bootstrap other protocols like Bluetooth™ or Wireless Ethernet (WiFi) by exchanging the configuration and session data. NFC is compatible with contactless smart card platforms. This enables NFC devices to read information from these cards, making contactless smart cards the ideal solution for bringing information and vouchers into the NFC world.

NFC devices can also operate like a contactless card making them compatible with the huge installed infrastructure of ISO14443A-compliant systems. This functionality is called card emulation. Secure NFC combines NFC applications with smart card security. Devices with secure NFC act like a contactless smart card with cryptographic capabilities. This means that confidential data, and data that represents values, is stored in a secure memory area and always stays on the card. Authentication is performed by the NFC device itself and transmitted data can be encrypted by the NFC device using a private encryption key stored in the device's secure memory.

The Near Field Communication Forum (NFC Forum) is a non-profit industry association founded by Nokia Corporation, Royal Philips Electronics and Sony Corporation to advance the use of NFC short-range wireless interaction in consumer electronics, mobile devices and PCs. The NFC Forum will promote implementation and standardization of NFC technology to ensure interoperability between devices and services.

To store NFC Forum defined data (called NDEF) e.g. inside contactless cards or RFID tags four different draft specifications have been made called: "Type 1 Tag Operational", "Type 2 Tag Operational", "Type 3 Tag Operational" and "Type 4 Tag Operational".

This invention is related inter alia to all contactless cards or RFID tags that are compliant to the "Type 2 Tag Operational" specification draft of the NFC Forum (available e.g. from www.nfc-forum.org). The "Type 2 Tag Operational" draft specification shows how to store data inside transponders used as NFC devices such as e.g. contactless cards and RFIDs.

There may be a need for an alternative way of storing and reading data in transponders such as contactless cards or RFID tags. Especially, there may be a need for a way of storing additional data in transponders such that the additional data is not accessible using a reader device which is compliant with a standardization protocol such as the "Type 2 Tag Operational" draft specification and such that it does not interfere with data stored in compliance with the standardization protocol. Furthermore, there may be a need for corresponding transponder devices, read/write devices, computer program elements and computer readable media for implementing such storing/reading method.

SUMMARY OF THE INVENTION

This need may be met by the subject matter according to the independent claims. Advantageous embodiments of the present invention are described in the dependent claims.

According to a first aspect of the invention there is provided a method for storing data in a memory array of a transponder. Therein, a data structure for storing data within the memory array is defined by a predetermined protocol. The data structure comprises: a header data block including predefined header data; an application data block for storing application data; and a memory control data block including a reservation indicator for indicating a reserved partial memory area of the memory array where, in accordance with the predetermined protocol, application data cannot be read or written by a protocol compliant reader device. According to the invention the method comprises the step of storing additional application data in the reserved partial memory area.

This aspect of the invention is based on the idea that transponders have a memory array of predetermined size. In this memory array, data can be stored. A structure of such stored data is predetermined by a given protocol such that data included in the data structure can be read or written by a protocol compliant read/write device being adapted to operate in accordance with the protocol.

The protocol defines that all application data is to be stored within the application data block. This application data block does not need to be continuous but can include separate data blocks having non-used, blocked or reserved memory areas in between. In accordance with the protocol, a reservation indicator indicates a reserved partial memory area within the memory array. This reservation indicator provides an indication to a read/write device operating in accordance with the predetermined protocol that application data is not allowed to be read or written in the blocked or reserved memory area. In other words, when a read device which is adapted to operate in accordance with the protocol reads data from the application data block, it is forced to jump over the indicated blocked or reserved memory area. On the other side, a write device which is adapted to operate in accordance with the protocol will write data into the application data block only in areas apart from the reserved memory area.

The method of the first aspect uses the data structure in accordance with the predetermined protocol but includes the additional feature that additional application data can also be stored in the memory array of the transponder in a reserved memory area which can not be accessed by a protocol compliant read/write device. In other words, the reservation indicator can be read but instead of indicating that in the reserved memory area no application data is allowed to be stored it can serve as an indication that in this reserved memory area additional application data can be stored.

Several advantages can be achieved with the invention. Memory space as e.g. a reserved or blocked memory area which according to the protocol is not used can be used for storing additional application data. As a protocol compliant reader device would not access the reserved or blocked memory these additional data can be hidden from access of such conventional reader device. At the same time, the data conventionally stored within the application data block in accordance with the protocol will not interfere with the additional application data. This provides backwards compatibility, i.e. a read/write device operating in accordance with the method of the present invention will manipulate the data structure within the memory of a tag only in a way that it remains compatible with conventional protocol compliant read/write devices.

In the following further details, definitions, features and characteristics about the method of the first aspect are given.

A transponder can be an active element, i.e. having a power source, or a passive element, i.e. without power source, being adapted for near field communication. For example, a transponder can be a RFID tag or a contactless card. Alternatively, the transponder can be an active device which emulates e.g. a tag. For example, the transponder can be included in a mobile phone having a battery wherein the transponder emulates the functions of an RFID tag such that a user can use his mobile phone like an RFID tag. The transponder can include a circuitry establishing an array of volatile or rewritable memory of predetermined size such as for example 64 Bytes or more.

A protocol can be used as a standard or specification defining how data are to be stored in the memory in terms of order and content. For example, the protocol can define which information is to be stored at a specific position within the memory array. Furthermore, the protocol can specify indicators or flags. A protocol specifically adapted for transponders is the "Type 2 Tag Operation specification" of the NFC Forum. It specifies, with a set of rules and guidelines, the operation of a NFC Forum Type 2 Tag which can be a tag, card or token compatible with the NFC Forum Type 2 specification and including a contactless IC chip, which has build-in memory and memory access functions. This protocol also defines how application data defined according to the NFC Data Exchange Format (NDEF) is detected, read from, and written to the Type 2 Tag in order to achieve and maintain interchangeability and interoperability at the NFC Forum Type 2 Tag read/write level.

The data structure within the memory array of the transponders can include several data blocks.

The header data block can include predefined header data including e.g. a unique identification code, a manufacturer code and static lock bytes representing a field-programmable read-only locking mechanism.

Application data to be stored in the application data block can include any kind of data. For example, data specific to an application to be run in the transponder or in a coupled read/write device can be stored. Alternatively, user specific data including e.g. authentification information can be stored. If the Type 2 Tag Operation specification of the NFC Forum is used as the protocol, the application data can include the NDEF message as specified in this protocol.

An optional terminator data block mainly provides the information that the application data block, which does not necessarily have a predetermined size, ends at this position. Basically, it can be provided as a single byte the content of which serves as a flag.

The memory control data block can be located anywhere within the memory area. Preferably, it is located between the header data block and the application data block. The reservation indicator for indicating the reserved partial memory area can be the only content of the memory control data block. Alternatively, the memory control data block can contain further information defining e.g. special purposes within the predetermined protocol. The reservation indicator can indicate a position or address within the memory array. From this position or address, a reserved memory area of predetermined size can extend. Alternatively, the reservation indicator can indicate a position or address and further more a size of the reserved memory area. The reservation indicator can also indicate a plurality of reserved memory areas. Alternatively, a plurality of reservation indicators can be included in the memory control data block.

The additional application data to be stored in the reserved memory area in accordance with the present invention can include any kind of data. It is not limited to a specific data format. E.g. it can avoid to use the overhead required by "Type 2 Tag Operational" specification draft and NFC Data Exchange Format (NDEF) as will be understood from the description further below.

According to an embodiment the method further comprises the step of storing a storage indicator for indicating that additional application data is stored within the reserved partial memory area. The storage indicator can be stored anywhere within the memory array, e.g. in the header data block, the application data block, the memory control data block or the optional terminator data block. For example, the storage indicator can be stored within reserved partial memory area right behind its starting position or just before its end position. Alternatively, the storage indicator can be stored at a predetermined position within the memory control data block.

The storage indicator can simply indicate that additional data is stored somewhere in an indicated reserved memory area and a reader device would have to search for the stored additional data autonomously using for example predetermined flags or a look-up table. Alternatively, the storage indicator can include information as to the position (e.g. absolute or relative to the position of a starting or end position of the reserved memory area), length, type or content of the stored additional application data. Then, the method can be performed taking into account at least one of these data. This can simplify and accelerate the finding and processing of additionally stored data.

In a second aspect of the invention a method for reading data in a memory array of a transponder is provided wherein a data structure for storing data within the memory array is defined by a predetermined protocol as outlined with respect to the first aspect. The method comprises: reading additional application data stored within the reserved memory area.

The second aspect is based on the idea to modify a method of reading data in accordance with the predetermined protocol such that, instead of ignoring the reserved memory area, a reader device can be specifically adapted to read additional data from this reserved memory area.

In an embodiment of the second aspect, the method includes searching for a storage indicator stored within the memory array, e.g. in at least one of the header data block, the application data block and the memory control data block, wherein the storage indicator includes data for indicating that additional application data is stored within the reserved memory area. The storage indicator can have the features as outlined above with respect to the first aspect.

In an embodiment in accordance with the above first or second aspect, the reservation indicator included in the memory control data block causes a protocol compliant reader device to jump over the indicated reserved partial memory area when storing or reading data in the memory array. That means, a read/write device that operates in compliance with the predetermined protocol can read/write data stored within the application data block before the reserved partial memory area and, when reaching a reserved memory area, can optionally continue reading/writing behind the reserved memory area. Accordingly, additional data stored in the reserved memory area will be hidden from the protocol compliant read/write device and can only be read/written with a read/write device operating in accordance with the above described method of the invention.

In a third aspect of the invention a transponder is provided in which data is stored and can be read in accordance with one of the above aspects or embodiments. The transponder can be an RFID tag or a contactless smart card or a device emulating such devices.

In a fourth aspect of the invention a read/write-device is provided which is adapted to perform the method according to one of the above aspects or embodiments. Specifically, the read/write-device can be able to find a memory data block and to detect a reservation indicator included therein. It can retrieve information about the position of additionally stored application data from the reservation indicator and read the additionally application data stored in the reserved memory area.

In a fifth aspect of the invention a computer readable medium is provided, the medium including a program element adapted to perform the method according to one of the above aspects or embodiments.

In a sixth aspect of the invention a program element is provided which is adapted to perform the method according to one of the above aspects or embodiments.

On the basis of the above given and the following explanation of the methods for storing or reading data in a transponder a skilled person will we able to translate the steps of the method into a computer program element for carrying out the method.

It has to be noted that embodiments of the invention are described with reference to different subject matters. In particular, some embodiments are described with reference to apparatus type claims whereas other embodiments are described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

The aspects defined above and further aspects of the present invention are apparent from the examples of embodiment to be described hereinafter and are explained with reference to the examples of embodiments. The invention will be described in more detail hereinafter with reference to examples of embodiments but to which the invention is not limited.

BRIEF DESCRIPTION OF THE DRAWINGS

FIG. 1 shows an example of a data structure in accordance with the Type 2 tag Operation specification of the NFC Forum.

DETAILED DESCRIPTION OF EMBODIMENTS

Figure 2:
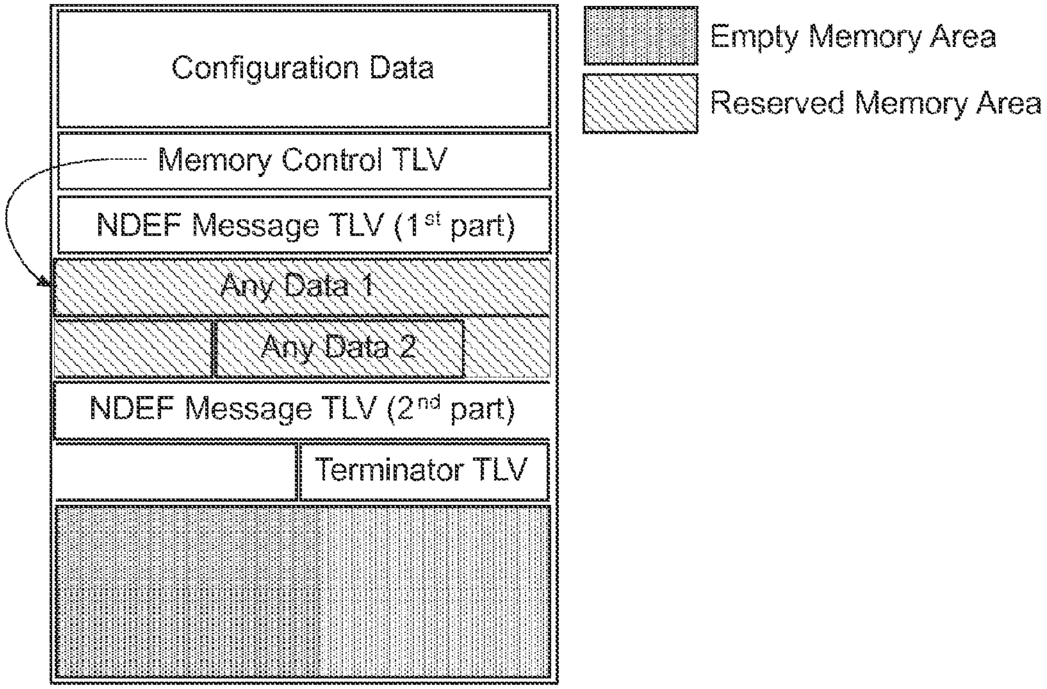
FIG. 2 schematically shows an exemplary data structure which can be read or written according to a an embodiment of the present invention.

In the following, embodiments of the present invention are described wherein the Type 2 Tag Operation specification of the NFC Forum (herein also called in the following "type 2 tag protocol") is used as the predetermined protocol. Main features of this protocol are described herein and the terminology used in this protocol will be used in the following description. Further details concerning this protocol can be obtained from the NFC Forum's publications available e.g. via www.nfc-forum.org. A read/write device which is adapted to operate in accordance with the type 2 tag protocol will also be referred as "NFC Forum Device" herein.

The following conventions and notations apply in this document unless otherwise stated:

Binary numbers are represented by strings of digits 0 and 1 shown with the most significant bit (msb) left and the least significant bit (lsb) right, "b" is added at the end.
Example: 11110101b Hexadecimal numbers are represented is using the numbers 0-9 and the characters A-F, a "h" is added at the end. The Most Significant Byte (MSB) is shown on the left, the Least Significant Byte (LSB) on the right.
Example: F5h Decimal numbers are represented as is (without any tailing character).
Example: 245

A type 2 tag is based on a particular memory chip with a certain memory size and space for data. The method of the present invention is especially applicable to tags of the type having a dynamic memory structure. This memory structure (or layout) is applied to Type 2 tags with a memory size bigger than 64 bytes. FIG. 1 shows an example of a memory layout of such tag. It is comprises different fields:

UID, Unique identifier

Internal, bytes for manufacturing usage

Reserved, reserved bytes

Lock, static and dynamic lock bytes, to switch the tag from READ/WRITE state to READ-ONLY state CC, Capability Container bytes Data, bytes used to store information In FIG. 1 each block is numbered from 0 to k. The block n indicates the last block of the data area of the memory array. Blocks from n+1 to k contain reserved or lock bytes.

Dynamic lock bytes and reserved bytes might be located at any byte address in between or at the end of the data areas starting from block 16.

It is to be noted that in the context of this application the term "reserved memory area" as used in the claims can include one or both of the reserved bytes and the lock bytes as defined in the type 2 tag protocol.

Reserved bytes belonging to reserved memory areas shall be ignored/jumped over during read and write operations with a NFC Forum device. Reserved bytes shall be identified by one or more Memory Control TLV blocks.

In the type 2 tag protocol TL V blocks are defined. A TL V block shall consist of one to three fields:

T (tag field, or T field) shall identify the type of the TLV block and shall consist of a single byte encoding a number from 00h to FFh.

L (length field, or L field) shall provide the size in bytes of the value field. It has two different formats composed of one, or three bytes. The NFC Forum Device shall understand all two length field formats.

V (value field, or V field) If the length field is equal to 00h or there is no length field, there shall not be the value field, i.e. the TLV block is empty. If there is the length field and indicates a length of the value field N bigger than zero (N>0), the value field shall consist of N consecutive bytes.

The following table lists the TLV blocks specified by the type 2 tag operation specification:

| TLV block name | Tag Field Value | Short Description |
|---|---|---|
| NULL TLV | 00h | It might be used for padding of memory areas and the NFC Forum Device shall ignore this |
| Lock Control TLV | 01h | It defines details of the lock bits |
| Memory Control TLV | 02h | It identifies reserved memory areas |
| NDEF Message TLV | 03h | It contains an the NDEF message |
| Proprietary TLV | FDh | Tag proprietary information |
| Terminator TLV | FEh | Last TLV block in the data area |

The TLV blocks shall be written in a specific order inside the data area:

NDEF Message TLVs and Proprietary TLVs are present after all Lock Control TLVs and Memory Control TLVs.

if present, the Terminator TLV is the last TLV block on the Type 2 tag platform

The Lock Control TLV may be present inside the Type 2 tag, and an NFC Forum Device shall be able to read/process it. It provides control information about the lock areas where the dynamic lock bytes are located. Each Lock Control TLV shall indicate a single lock area. More lock areas shall be indicated using more Lock Control TLV blocks. Below the encoding of the 3 TLV fields of Lock Control TLV are shown:

T SHALL be equal to 01h (see Table 2).

L SHALL be equal to 03h.

V SHALL be composed of 3 bytes that uniquely identify the position and the size of the lock area, and the number of pages locked by each bit of the dynamic lock bytes. The 3 bytes SHALL be encoded in the following way:

Position, MSB. It codes the position inside the tag of the lock area. The position byte consists of 2 parts (to calculate the bytes address from the position byte see below):

PagesAddr, most significant nibble (4 bits), coded as number of pages (0h=0 . . . Fh=15) and ByteOffset, least significant nibble, coded as number of bytes (0h=0 . . . Fh=15).

Size, middle byte, coded as number of bits (01h=1 . . . FFh=255, 00h=256). It indicates the size in bits of the lock area.

Page control, LSB. The page control provides general control information: the size in bytes of a page, and the number of bytes that each dynamic lock bit is able to lock. Page control byte is split up into two nibbles of 4 bits each:

BytesPerPage: least significant nibble, coded as $2^n$ (0h=RFU, 1h=1 . . . Fh=15). It indicates the number of bytes per page.

BytesLockedPerLockBit: most significant nibble, coded as $2^n$ (0h=RFU, 1h=1 . . . Fh=15). It indicates the number of bytes that each dynamic lock bit is able to lock.

From the position byte, the byte address (ByteAddr) of the lock area shall be calculated in the following way:

$$ByteAddr=PageAddr*2^{BytesPerpage}+ByteOffset$$

The ByteAddr is calculated from the beginning of the overall memory tag; Byte 0 of Block 0 is indicated by ByteAddr equal to 0.

The byte address shall be used to read and write the relative lock area using the appropriate READ and WRITE commands. The page definition has nothing to do with the block definition used by READ and WRITE commands. The block has a fixed size equal to 4 bytes instead the size of a page is defined by the BytesPerPage field.

It is to be noted that the lock Control TLV might be skipped if a Type 2 tag is in READ-ONLY state. Lock Control TLV blocks can be replaced by Memory Control TLV indicating the same memory areas for Type 2 tag in READ-ONLY state.

The Memory Control TLV may be present inside the Type 2 tag, and an NFC Forum Device shall be able to read/process it. It provides control information about the reserved areas where the reserved bytes are located, and the size of the reserved bytes.

If the Type 2 tag is delivered by the vendors in READ-ONLY state, the Memory Control TLV may be used to indicate control information for reserved and lock areas. Contiguous and alternating lock and reserved areas may be indicated by a single Memory Control TLV.

Below the encoding of the 3 TLV fields of Memory Control TLV are shown:

T shall be equal to 02h.

L shall be equal to 03h.

V shall be composed of 3 bytes that uniquely identifies the position and the size of the reserved area. The 3 bytes shall be encoded in the following way:

Position, MSB of the reserved Area field. It codes the position inside the tag of the reserved area. The Position byte consists of 2 parts (to calculate the bytes address from the position byte see below):

PagesAddr, most significant nibble, coded as number of pages (0h=0 . . . Fh=15) and ByteOffset, least significant nibble, coded as number of bytes (0h=0 . . . Fh=15).

Size, middle byte, coded as number of bytes (1h=1, FFh=255, 0h=256). It indicates the size in bytes of the reserved area.

Partial Page Control, LSB. The partial page control provides the size in bytes of a page. It is split up into two nibbles of 4 bits each:

BytesPerPage nibble: least significant nibble, coded as $2^n$ (0h=RFU, 1h=1 . . . Fh=15).

It indicates the number of bytes per page.

Most significant nibble is RFU.

The byte address (ByteAddr) of each reserved area shall be calculated in the following way:

$$\text{ByteAddr}=\text{PageAddr}*2^{\text{BytesPerpage}}+\text{ByteOffset}$$

The page definition has nothing to do with the block definition used by READ and WRITE commands. The block has a fixed size equal to 4 bytes instead the size of a page is defined by BytesPerPage field.

The NDEF Message TLV shall be always present inside the Type 2 tag. It stores the NDEF message inside the Value field. The NFC Forum Device shall be able to read/process the first NDEF message found; anyhow further NDEF Message TLV blocks MAY be present. Below the encoding of the 3 TLV fields of NDEF Message TLV is shown:

T SHALL be equal to 03h.

L SHALL be equal to the size in bytes of the stored NDEF message.

V SHALL store the NDEF message.

The Terminator TLV may be present inside the Type 2 tag, and an NFC Forum Device shall be able to read/process it. According to the type 2 tag operation specification of the NFC forum, the Terminator TLV is the last TLV block in the data memory area.

Terminator TLV shall be composed of 1 byte tag field. Below the encoding of the tag field of the Terminator TLV are shown:

T SHALL be equal to FEh.

L SHALL NOT be present.

V SHALL NOT be present.

FIG. 2 shows a data structure which can be read and written in accordance with an embodiment of the invention. In a header data block, configuration data including e.g. a tag unified identifier, lock bytes and manufacturer bytes may be stored. After the header data block, an application memory is located. Therein, application or user data can be stored in the form of one or more NDEF message TLVs. Additionally, a memory control data block can include reservation indicators for indicating a reserved partial memory area. In the type 2 tag protocol, this feature can be implemented by the memory control TLV. Behind the application data block, a terminator data block is located. It includes a Terminator TLV indicating to a NFC Forum Device the last byte of valid data in the application data block.

According to the type 2 tag protocol, the reserved memory area and the memory area after the Terminator TLV is not used and a NFC Forum device is adapted to jump over the reserved memory area and to stop any read/write operation at the location of the Terminator TLV. The non-used memory area of the reserved memory area is exploited by this embodiment of the invention to store additional data (called in the picture Any Data 1 and Any Data 2). This reserved memory area is sometimes also referred to as "fake reserved memory area".

In the example in FIG. 2 the NDEF Message TLV is split by a fake reserved memory area that contains Any Data 1 and Any Data 2. The NDEF Message TLV may be written several times. However its changes do not affect the Any Data 1 and Any Data 2 inside the reserved memory area. According to the present embodiment Any Data 1 and Any Data 2 may also be modified but it should fit inside the reserved memory area.

The indication of the existence of the additional data in the reserved memory area may be:

contained inside any NDEF Message TLV, or Proprietary TLV stored before the Terminator TLV, implicitly given from the position and size of the reserved memory area inside the contactless tag using the Memory Control TLV, or indicated by the unique identifier of the tag and any information related to the tag itself and not to the data stored in it.

In the example of FIG. 2 the indication of the existence of Any Data 1 and Any Data 2 is implicitly given by the Memory Control TLV.

There might be one or more fake reserved memory areas with additional application data. Each fake reserved memory area might contain one or more even non-contiguous chunks of data that in the example are called Any Data 1, and Any Data 2.

The number, size and/or position of the chucks inside the fake reserved memory area may be indicated:

inside any NDEF Message TLV, or Proprietary TLV, inside any fake reserved memory area, by any application, or implicitly by the unique identifier of the tag and any information related to the tag itself and not the data stored in it.

The fake reserved memory areas with additional data may be located anywhere inside the tag memory area after and also before the Terminator TLV. However, if a NFC Forum device is to be used, the rules described in the Type 2 Tag protocol concerning the reserved memory area location inside a tag must be respected.

Figure 3:
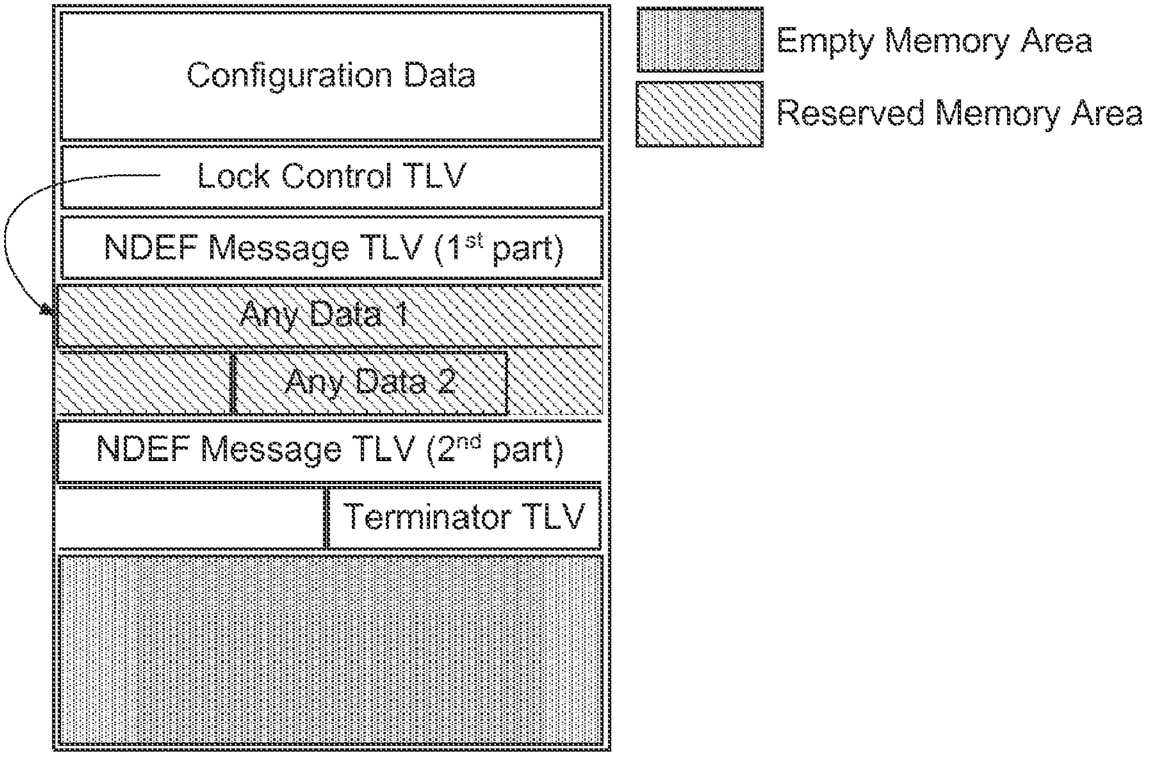
FIG. 3 schematically shows another exemplary data structure which can be read or written according to a another embodiment of the present invention.

FIG. 3 shows a data structure which can be written and read in accordance with another embodiment of the invention. Therein, the fake reserved memory areas may be replaced using the dynamic lock bit areas. These ones are indicated using the Lock Control TLV. The advantages and the indication of additional data using the dynamic lock bit areas are similar to that ones related to the fake reserved memory areas.

The only difference is when the contactless tag changes its state from READ/WRITE to READ_ONLY operation performed by a NFC Forum compliant reader device. In this case all lock bits must be set to 1b i.e. the additional data inside the dynamic lock bits areas is completely lost.

The invention can be used to be backward compatible with existing infrastructure like reader devices already deployed but at the same time to provide new additional features.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

The "Type 2 Tag Operational" draft specification shows how to store data inside a specific type of contactless cards or tags. This invention provides an additional way to store data inside the tag. It may be used for example to extend the memory area of new application versions, remaining backward compatible with the old ones. Moreover it provides a way to store data inside the tag data that cannot be seen by an NFC Forum reader device. This functionality may be used to store any kind of data in any kind of format. For example this allows storing data without the overhead proposed by the type 2 tag protocol and NFC Data Exchange Format (NDEF).

The invention provides an additional method to store data inside any contactless card or tag compliant to the type 2 tag protocol. It is intended for any NFC Forum Device e.g. mobile phones, PDA, that stores data inside NFC Forum Type 2 Tags.

Possible advantages of this solution are inter alia:

exploitation of non-used memory area: the data is stored in non-used memory area of the Type 2 Tag, capability to hide data in non-used memory areas being not visible using NFC Forum compliant reader devices, an NFC Forum compliant reader device may write data in the non-reserved areas without modifying the reserved memory areas.

the method can be used by NFC Forum application that need an additional memory area to store data without touching the one defined by the NFC Forum standardization e.g. due to backward compatibility reasons.

The invention is applicable inter alia to:

all contactless tags compliant to the "Type 2 Tag Operational" specification draft of the NFC Forum, and any data structure that follows that one specified by the "Type 2 Tag Operational" specification draft of the NFC Forum.

The invention claimed is:

1. A method for storing data in a memory array of a transponder, wherein a data structure for storing data within the memory array is defined by a predetermined protocol, the data structure comprising a header data block including predefined header data, an application data block for storing application data, and a memory control data block including a reservation indicator for indicating a reserved partial memory area of the memory array between the header data block and the application data block, the method comprising storing additional application data in the reserved partial memory area, wherein a specialized reader device is used to access the reserved partial memory area and a protocol compliant reader device cannot access the reserved partial memory area; and storing a storage indicator for indicating that the additional application data are stored within the reserved partial memory area.

2. The method according to claim 1, wherein the storage indicator is stored in the memory control data block.

3. A method for reading data in a memory array of a transponder, wherein a data structure for storing data within the memory array is defined by a predetermined protocol, the data structure comprising a header data block including predefined header data, an application data block for storing application data, and a memory control data block including an reservation indicator for indicating a reserved partial memory area of the memory array between the header data block and the application data block, the method comprising:

reading, with a specialized reader device, additional application data stored within the reserved partial memory area, wherein a protocol compliant reader device cannot access the reserved partial memory area; and searching for a storage indicator.

4. The method according to claim 3, wherein the storage indicator is stored in the memory control data block and includes data for indicating that the additional application data are stored within the reserved memory area.

5. The method according to claim 2, wherein the storage indicator comprises a storage address.

6. The method according to claim 1, further comprising:

causing, with the reservation indicator included in the memory control data block, the protocol compliant reader device to jump over the indicated reserved partial memory area when storing or reading data in the memory array.

7. The method according to claim 1, wherein the reserved partial memory area is positioned within the application data block.

8. The method according to claim 1, wherein the predetermined protocol is the Type 2 Tag Operation specification of the Near Field Communication (NFC) Forum.

9. A transponder in which data are stored in accordance with claim 1.

10. A read/write device adapted to perform the method according to claim 1.

11. A non-transitory computer readable medium including a program element adapted to perform the method according to claim 1.

12. The method according to claim 1, wherein the storage indicator is stored in the header data block.

13. The method according to claim 1, wherein the storage indicator is stored in the application data block.

14. The method according to claim 3, wherein the storage indicator is stored in the header data block.

15. The method according to claim 3, wherein the storage indicator is stored in the application data block.

16. The method according to claim 2, wherein the storage indicator comprises an absolute position.

17. The method according to claim 2, wherein the storage indicator comprises a position relative to a starting position of the reserved partial memory area.

18. The method according to claim 2, wherein the storage indicator comprises a position relative to an ending position of the reserved partial memory area.

19. The method according to claim 1, further comprising:

replacing the reserved partial memory area with a dynamic lock bit area.

20. The method according to claim 1, wherein the transponder is an active device that emulates a Radio Frequency IDentification (RFID) tag.

* * * * *